United States Patent [19]

Ohmori et al.

[11] Patent Number: 4,810,766

[45] Date of Patent: Mar. 7, 1989

[54] ACRYLOXYORGANOSILOXANE POLYMER

[75] Inventors: Akira Ohmori, Ibaraki; Takashi Yasuhara, Settsu; Takahiro Kitahara, Suita, all of Japan

[73] Assignee: Daikin Industries, Ltd., Osaka, Japan

[21] Appl. No.: 105,242

[22] Filed: Oct. 7, 1987

[30] Foreign Application Priority Data

Oct. 9, 1986 [JP] Japan .................. 61-241117

[51] Int. Cl.$^4$ ............................................. C08F 30/08
[52] U.S. Cl. ...................... 526/279; 528/32; 428/336; 428/339; 427/387
[58] Field of Search ................ 526/279; 528/32; 428/336, 339; 427/387

[56] References Cited

U.S. PATENT DOCUMENTS 4,216,303 8/1980 Novicky ............................. 526/279
4,508,884 4/1985 Wittmann et al. .................. 526/279

Primary Examiner—Melvyn I. Marquis
Attorney, Agent, or Firm—Larson and Taylor

[57] ABSTRACT

Disclosed are an acryloxyorganosiloxane polymer having a structural unit represented by the formula (1):

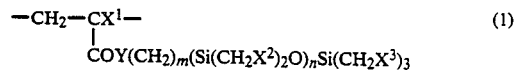

wherein $X^1$ is chlorine atom or fluorine atom, $X^2$ and $X^3$ are the same or different and each represent hydrogen atom or a group $-CH_2(CF_2)_pCF_3$ (wherein p is 0 or an integer of 1 to 5), Y is oxygen atom or $-NH-$ group, m is 0 or an integer of 1 to 5 and n is 0 or an integer of 1 to 5; an acryloxyorganosiloxane polymer further having a structural unit represented by the following formula (2) in an amount of not more than 50% by weight based on the combined weight of the structural unit of the formula (1) and the structural unit of the formula (2):

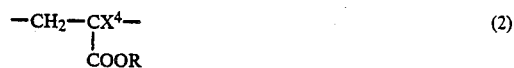

wherein $X^4$ is hydrogen atom, chlorine atom, fluorine atom, alkyl group having 1 to 3 carbon atoms or fluoroalkyl group having 1 to 3 carbon atoms, R is alkyl group having 1 to 20 carbon atoms or fluoroalkyl group having 1 to 20 carbon atoms (with the proviso that oxygen atom may be contained in the carbon atom chain); and a gas separating membrane prepared from the polymer having the structural unit of the formula (1) or a combination of structural unit of the formula (1) and not more than 50% by weight of structural unit of the formula (2).

9 Claims, No Drawings

ACRYLOXYORGANOSILOXANE POLYMER

FIELD OF THE INVENTION

The present invention relates to a novel acryloxyorganosiloxane polymer and more particularly to a gas separating membrane prepared from the polymer for use in producing oxygen-enriched air.

DESCRIPTION OF THE PRIOR ART

Silicone, polyacetylene, polyfluoroalkyl methacrylate and the like are known as polymeric materials of gas separating membranes able to produce oxygen-enriched air. The gas separating membranes composed of silicone, polyacetylene or the like are great in the oxygen permeability coefficient but small in the separation coefficient which is the ratio of oxygen permeability coefficient to nitrogen permeability coefficient. In consequence, these membranes produce oxygen-enriched air having an oxygen concentration of about 30% by volume at highest. On the other hand, the gas separating membranes formed of polyfluoroalkyl methacrylate or the like are great in the separation coefficient and capable of producing oxygen-enriched air in an oxygen concentration of at least 40% by volume. Yet these membranes are small in the oxygen permeability coefficient, entailing difficulties in producing large amounts of oxygen-enriched air.

Oxygen-enriched air for use in medical applications must have a high oxygen concentration of at least 40% by volume. While oxygen-enriched air in a low oxygen concentration of about 30% by volume is sufficient for use, e.g. with boilers and in iron manufacture, fermentation or the like needs large amounts of oxygen-enriched air in an oxygen concentration of 30 to 40% by volume. Conventional gas separating membranes are so limited in performance and are not usable in fermentation and other applications.

BRIEF DESCRIPTION OF THE INVENTION

It is an object of the present invention to provide a novel acryloxyorganosiloxane polymer.

It is another object of the invention to provide a gas separating membrane useful for producing oxygen-enriched air.

We tentatively prepared a wide variety of silicone-containing polymers and produced membranes from the polymers to investigate the permeability of the membranes to oxygen. The investigation showed that polymers having a specific structure are suitable for manufacture of gas separating membranes capable of producing large amounts of oxygen-enriched air in an oxygen concentration of 30 to 40% by volume. The present invention have been accomplished based on this novel finding.

DETAILED DESCRIPTION OF THE INVENTION

The present invention provides an acryloxyorganosiloxane polymer comprising a structural unit represented by the formula (1):

$$-CH_2-CX^1- \atop | \atop COY(CH_2)_m(Si(CH_2X^2)_2O)_nSi(CH_2X^3)_3 \qquad (1)$$

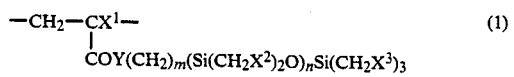

wherein $X^1$ is chlorine atom or fluorine atom, $X^2$ and $X^3$ are the same or different and each represent hydrogen atom or a group $-CH_2(CF_2)_pCF_3$ wherein p is 0 or an integer of 1 to 5, Y is oxygen atom or $-NH-$ group, m is 0 or an integer of 1 to 5 and n is 0 or an integer of 1 to 5, and an acryloxyorganosiloxane polymer comprising the structural unit of the formula (1) in an amount of up to 100% by weight and a structural unit represented by the following formula (2) in an amount of not more than 50% by weight based on the combined weight of the structural unit of the formula (1) and the structural unit of the formula (2):

$$-CH_2-CX^4- \atop | \atop COOR \qquad (2)$$

wherein $X^4$ is hydrogen atom, chlorine atom, fluorine atom, alkyl group having 1 to 3 carbon atoms or fluoroalkyl group having 1 to 3 carbon atoms, R is alkyl group having 1 to 20 carbon atoms or fluoroalkyl group having 1 to 20 carbon atoms (with the proviso that oxygen atom may be contained in the carbon atom chain). The present invention also provides a gas separating membrane prepared from the polymer comprising the structural unit of the formula (1) and a gas separating membrane prepared from the polymer comprising the structural unit of the formula (1) in an amount of up to 100% by weight and the structural unit of the formula (2) in an amount of not more than 50% by weight based on the combined weight of the structural unit of the formula (1) and the structural unit of the formula (2).

Preferably 50 to 100% by weight of the structural unit of the formula (1) is contained in the polymer of the present invention in order to produce large amounts of oxygen-enriched air having an oxygen concentration of 30 to 40% by volume.

The structural unit of the formula (2) is the component of conventional gas separating membranes and may be contained in an amount of not more than 50% by weight in the polymer of the invention.

The polymer of the invention wherein $X^1$ in the structural unit of the formula (1) is fluorine can be made into a membrane higher in flexibility and other properties than when using the polymer wherein $X^1$ is chlorine.

Examples of $C_{1-20}$ fluoroalkyl groups and fluoroalkylether groups as R group in the structural unit of the formula (2) (with the proviso that oxygen atom may be contained in the carbon atom chain) include groups represented by the formula $$-(CH_2)_pRf$$

wherein Rf is fluoroalkyl group having 1 to 19 carbon atoms and containing fluorine in an amount of at least twice the number of carbon atoms, and p is an integer of 1 to 5, and groups represented by the formula $$-(CH_2)_qCF(CF_3)(OCF_2CF(CF_3))_rOC_3F_7$$

wherein q is an integer of 1 to 5 and r is 0 or an integer of 1 to 5.

The polymer of the present invention can be prepared by homopolymerizing a siloxane monomer represented by the formula $$H_2C=CX^1- \atop | \atop COY(CH_2)_m(Si(CH_2X^2)_2O)_nSi(CH_2X^3)_3$$

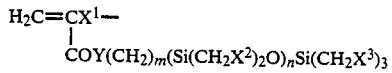

wherein $X^1$, $X^2$, $X^3$, Y, m and n are as defined above, or copolymerizing the foregoing monomer with a conventional monomer represented by the formula $$CH_2=CX^4$$
$$\ \ \ \ \ |$$
$$\ \ \ \ \ COOR$$

wherein $X^4$ and R are as defined above. Other ethylenically unsaturated compounds can be copolymerized with such monomer insofar as the use of the compound does not impair the properties of the polymer.

Polymerization methods useful in the present invention include conventional methods of solution polymerization, mass (block) polymerization or suspension polymerization and so on (see Japanese Unexamined Patent Publication No.111309/1986). The polymerization is carried out usually at 0° C. to about 150° C. using about 100 parts by weight of monomer(s), about 0.01 to about 5 parts by weight of a polymerization initiator, 0 to about 10 parts by weight of a chain transfer agent and an excess amount of solvent. Examples of useful polymerization initiators are benzoyl peroxide, dicumyl peroxide, tertiary butyl peroxide and like organic peroxides, azobisisobutyronitrile and like azo compounds, etc. Examples of useful chain transfer agents are lauryl mercaptan and the like. Useful solvents include ethyl acetate, chloroform, methyl ethyl ketone and the like.

The siloxane monomer previously noted is a novel compound which can be prepared by, for example, the following process (i), (ii) or (iii).

Process (i)

A compound represented by the formula $$CH_2=CX^1COOM$$

wherein M is alkali metal and $X^1$ is as defined above is reacted with a chloromethylated organosilicone compound represented by the formula $$Cl(CH_2)_m(Si(CH_2X^2)_2O)_nSi(CH_2X^3)_3$$

wherein $X^2$, $X^3$, m and n are as defined above in an aprotic polar solvent such as dimethylformamide in the presence of a polymerization inhibitor such as hydroquinone, tertbutyl catechol or the like at about 50 to about 130° C. for about 1 to about 24 hours.

Process (ii)

(A) A compound represented by the formula $$CH_2=CX^1COOM$$

wherein M and $X^1$ are as defined above is reacted with a compound represented by the formula $$Cl(CH_2)_mSi(CH_2X^2)_2OSi(CH_2X^2)_2(CH_2)_mCl$$

wherein $X^2$ and m are as defined above in a mole ratio of the former to the latter of 2:1 in an aprotic polar solvent such as dimethylformamide or the like in the presence of the polymerization inhibitor of the type used above at about 50° to about 130° C. for about 1 to about 24 hours to obtain a compound represented by the formula $$CH_2=CX^1COO(CH_2)_mSi(CH_2X^2)_2OSi(CH_2X^2)_2(CH_2)mOOCCX^1=CH_2$$

wherein $X^1$, $X^2$ and m are as defined above.

(B) The compound thus obtained is then reacted with a compound represented by the formula $$(CH_2X^3)_3SiOSi(CH_2X^3)_3$$

wherein $X^3$ is as defined above in a mole ratio of the former to the latter of 1:3 in the presence of an acid catalyst such as sulfuric acid, trifluoroacetic acid or the like at 0° C. to about 130° C. for about 1 hour to about 10 days.

Process (iii)

(A) A compound represented by the formula $$CH_2=CX^1COX^4$$

wherein $X^1$ is as defined above and $X^4$ is halogen atom is reacted with a compound represented by the formula $$NH_2(CH_2)_mSi(CH_2X^2)_2OSi(CH_2X^2)_2(CH_2)_mNH_2$$

wherein $X^2$ and m are as defined above in a mole ratio of the former to the latter of 2:1 in the presence of a base such as triethylamine, pyridine, N,N-dimethylbenzylamine or the like at about $-50°$ to about 10° C. to obtain a compound represented by the formula $$CH_2=CX^1CONH(CH_2)_mSi(CH_2X^2)_2OSi(CH_2X^2)_2(CH_2)mNHOCCX^1=CH_2$$

wherein $X^1$, $X^2$ and m are as defined above.

(B) The compound thus obtained is subjected to the reaction (B) as described above in the process (ii).

A solvent such as benzene, toluene, chloroform or the like can be used in the reaction (A) in the process (iii) although the reaction (A) proceeds without such solvent.

The polymer of the present invention is applied to the smooth-surfaced plate made of glass, metal or the like or to a porous substrate of film or hollow fiber of polytetrafluoroethylene, polypropylene, polyethylene or the like, for example, by conventional film-forming methods such as bar coater, spin coater, dipping or Langmuir method to form a membrane. The membrane formed on the smooth-surfaced plate of metal or the like is used as fixed to a suitable substrate. On the other hand, the membrane formed on the porous substrate is used as adhered thereto. The thickness of the membrane is usually about 0.1 to about 200 μm.

The oxygen permeability coefficient of the gas separating membrane prepared from the polymer of the invention is usually not greater than $10^{-5}$ cm$^3$•cm/cm$^2$•sec•cmHg and the nitrogen permeability coefficient thereof is about 20 to about 40% based on the oxygen permeability coefficient thereof.

The polymer of the present invention not only finds use as materials of gas separating membranes of the type previously described but also is usable as contact lenses, filters, separators for electric cells or the like by utilizing its high permeability to oxygen.

EXAMPLES

Reference Example 1

Synthesis of siloxane monomer

Into a 1-l flask equipped with a Dimroth condenser, a stirrer and a thermometer were placed 64 g (0.5 mole)

of a compound represented by the formula $CH_2=CFCOOK$, 61 g (0.5 mole) of a compound represented by the formula $ClCH_2Si(CH_3)_3$, 500 cc of dimethylformamide and 1 g of tert-butyl catechol. The mixture was heated to undergo 2.5 hours of reflux.

After cooling, the potassium chloride was filtered off. Then the filtrate was washed with 3 l of water and the oil layer was distilled off, giving 75 g of a siloxane monomer represented by the formula $CH_2=CFCOOCH_2Si(CH_3)_3$ and having a boiling point of 46.5° C./10 mmHg.

Reference Example 2

Synthesis of siloxane monomer

Into the flask of the type used in Reference Example 1 were placed 44.7 g (0.35 mole) of a compound represented by the formula $CH_2=CFCOOK$, 40.4 g (0.175 mole) of a compound represented by the formula $ClCH_2Si(CH_3)_2OSi(CH_3)_2CH_2Cl$, 66 cc of dimethylformami tert-butyl catechol. The mixture was heated to undergo 1.5 hours of reflux.

After cooling, the potassium chloride was removed from the reaction mixture by filtration, the filtrate was washed with water and the oil layer was distilled off, giving 50 g of a compound represented by the formula $CH_2=CFCOOCH_2Si(CH_3)_2OSi(CH_3)_2CH_2OCOCF=CH_2$ and having a boiling point of 96° C./15 mmHg.

A 40 g (0.118 mole) quantity of the compound thus obtained, 58 g (0.357 mole) of a compound represented by the formula $(CH_3)_3SiOSi(CH_3)_3$, 0.24 g (2.4 mmoles) of sulfuric acid, 0.59 g (5.2 mmoles) of trifluoroacetic acid and 1 g of tert-butyl catechol were mixed together and stirred at 25° C. for 240 hours. The distillation of mixture gave 68 g of a siloxane monomer represented by the formula $CH_2=CFCOOCH_2Si(CH_3)_2OSi(CH_3)_3$ and having a boiling point of 65° C./6 mmHg.

Reference Example 3

Into a 300 cc four-necked flask equipped with a dropping funnel, a Dimroth condenser, a stirrer and a thermometer were placed 50 g (0.20 mole) of a compound represented by the formula $$NH_2(CH_2)_3Si(CH_3)_2OSi(CH_3)_2(CH_2)_3NH_2$$

40.48 g(0.40 mole) of triethylamine and 160 cc of chloroform. The mixture was cooled to not higher than 10° C. while adding dropwise through the dropping funnel 40.5 g (0.44 mole) of a compound represented by the formula $CH_2=CFCOF$.

The reaction mixture was washed with 600 cc of deionized water and the chloroform layer was concentrated by an evaporator. After addition of 1 g of catechol, the mixture was heated to 120° C. under reduced pressure of 1 mmHg, thereby removing completely the chloroform.

To the residue were added 73.08 g (0.45 mole) of hexamethyl disiloxane, 2 g of trifluoroacetic acid and 0.8 g of sulfuric acid. The mixture was stirred at 100° C. for 24 hours. After cooling, the mixture was washed with 200 cc of a 5% aqueous solution of sodium carbonate and 300 cc of deionized water. The organic materials were distilled off, giving 66 g of a siloxane monomer represented by the formula $CH_2=CFCONH(CH_2)_3Si(CH_3)_2OSi(CH_3)_3$ and having a boiling point of 92° to 93° C./1.5 mmHg.

EXAMPLE 1

Into a glass autoclave were placed 50 g of the siloxane monomer obtained in Reference Example 1, 50 g of ethyl acetate and 0.05 g of azobisisobutyronitrile. The mixture was repeatedly subjected to freezing deaeration three times after which the mixture was maintained at 54° C. for 24 hours to undergo polymerization.

The polymer of the present invention thus obtained was dried under reduced pressure to obtain a 5 wt % solution of mixture in toluene. The solution was cast onto a glass plate by a doctor blade and dried, forming a uniformly thick membrane having a thickness of 41 μm.

Using the membrane thus obtained, the oxygen permeability coefficient ($KO_2$) and nitrogen permeability coefficient ($KN_2$) were determined according to ASTM 1434 (V method) under the following conditions. Thereafter the separation coefficient between oxygen and nitrogen ($\alpha=KO_2/KN_2$) was determined. A table below shows the values of $KO_2$ and $\alpha$.

Conditions for measuring the permeability coefficient (1) Gas used:
   standard mixture of 79% by volume of nitrogen and 21% by volume of oxygen
(2) Test pressures:
   primary pressure 4 kg/cm² (absolute) and secondary pressure 1 kg/cm² (absolute)
(3) Amount of permeation of gas:
   4 cc
(4) Testing time:
   time taken for the permeation of the gas (sec.) through the membrane
(5) Thickness of membrane :
   value obtained by measuring the weight of polymer on the substrate and dividing the weight by the area of the polymer fixed to the substrate and the specific gravity of the polymer.

The $^1$H-NMR analysis of the polymer obtained above was carried out with the following result.

δ(ppm); 0.10 <u>(Si(CH$_3$)$_3$)</u>, 2.48 <u>(—CH$_2$—CF—)</u>, 3.80 <u>(—COOCH$_2$Si—)</u>

EXAMPLE 2

Polymerization was conducted and a membrane was formed by repeating the same procedure as in Example 1 with the exception of using the siloxane monomer prepared in Reference Example 2 in place of the siloxane monomer obtained in Reference Example 1. A membrane thus obtained was uniform in thickness and 151 μm thick. The table below shows the values of $KO_2$ and $\alpha$.

The $^1$H-NMR analysis of the polymer obtained was conducted with the result shown below.

δ(ppm); 0.08 <u>(—Si(CH$_3$)$_3$)</u>, 0.16 <u>(—Si((CH$_3$)$_2$—)</u>, 2.42 (-<u>CH</u>o-CF-), 3.69(-<u>COOCH$_2$</u>1.42 (—<u>CH$_2$</u>—CH—), 3.69(—<u>COOCH$_2$Si</u>—)

EXAMPLE 3

The same procedure as in Example 1 was repeated with the exception of using 20 g of the siloxane monomer obtained in Reference Example 2, 80 g of a monomer represented by the formula $CH_2=CFCOOCH_2C(CH_3)_3$, 0.5 g of lauryl mercaptan and 0.1 g of azobisisobutyronitrile to effect polymerization and to form a membrane. The membrane thus ob-

EXAMPLE 4

Polymerization and formation of membrane were performed by following the same procedure as in Example 3 with the exception of using 50 g each of the siloxane monomer obtained in Reference Example 2 and a monomer represented by the formula $CH_2=CFCOOCH_2C(CH_3)_3$. The membrane thus obtained was uniform in thickness and 49 μm thick. The table below shows the values of $KO_2$ and $\alpha$.

EXAMPLE 5

Fifty parts by weight of a homopolymer of monomer represented by the formula $CH_2=CFCOOCH_2C(CH_3)_3$ and 50 parts by weight of a homopolymer of the siloxane monomer obtained in Reference Example 2 were made into a 5 wt % solution of the mixture in toluene. A membrane was produced by following the same procedure as in Example 1 and the coefficients as noted above were measured. The table below shows the values of $KO_2$ and $\alpha$.

EXAMPLE 6

The same procedure as in Example 5 was repeated with the exception of using 20 parts by weight of a homopolymer of monomer represented by the formula $CH_2=CFCOOCH_2C(CH_3)_3$ and 80 parts by weight of a homopolymer of the siloxane monomer obtained in Reference Example 2 to form a membrane. Thereafter, the coefficients were determined. The table below shows the values of $KO_2$ and $\alpha$.

EXAMPLE 7

The same procedure as in Example 1 was repeated with the exception of using a monomer represented by the formula $CH_2=CFCOO(CH_2)_3Si(CH_3)_3$ in place of the monomer used in Example 1 to effect polymerization and formation of membrane. The membrane thus obtained was uniform in thickness and 53 μm thick. The table below shows the values of $KO_2$ and $\alpha$.

EXAMPLE 8

The same procedure as in Example 1 was repeated with the exception of using a monomer represented by the formula $CH_2=CClCOOCH_2Si(CH_3)_2OSi(CH_3)_3$ in place of the monomer used in Example 1 to effect polymerization and formation of membrane, giving a uniformly thick membrane of 60 μm in thickness. The table below shows the values of $KO_2$ and $\alpha$.

EXAMPLE 9

The same procedure as in Example 1 was repeated with the exception of using the siloxane monomer prepared in Reference Example 3 in place of the monomer obtained in Reference Example 1 to effect polymerization and formation of membrane, giving a uniformly thick membrane of 95 μm in thickness. The table below shows the values of $KO_2$ and $\alpha$.

The $^1$H-NMR analysis of the polymer thus prepared was conducted with the following result:

$\delta$(ppm); 0.09 (—Si(CH$_3$)$_3$ and —Si(CH$_3$)$_2$—), 0.50 (—NHCH$_2$CH$_2$CH$_2$Si—), 1.50(—NHCH$_2$CH$_2$CH$_2$Si—), 2.40 (—CH$_2$—CF—), 3.16 (—NHCH$_2$CH$_2$CH$_2$Si—), 6.36 (—CONHCH$_2$—).

Comparison EXAMPLE 1

Polymerization and formation of membrane were conducted in the same manner as in Example 1 with the exception of using a monomer represented by the formula $CH_2=CFCOOCH(CH_3)_2$ in place of the monomer used in Example 1. The membrane thus obtained was uniformly thick and 45 μm in thickness. The table below shows the values of $KO_2$ and $\alpha$.

Comparison EXAMPLE 2

A homopolymer of monomer represented by the formula $CH_2=C(CH_3)COO(CH_2)_5(Si(CH_3)_2O)_4Si(CH_3)_3$ was prepared by the method described in POLYMER JOURNAL, Vol. 17 (1985), No.11, pp 1159 to 1172. Then the same subsequent procedure as in Example 1 was executed to form a membrane after which the coefficients were measured. The table below shows the values of $KO_2$ and $\alpha$.

TABLE

| Example | $KO_2$ ($\times 10^{-10}$) | $\alpha$ |
|---|---|---|
| 1 | 30.5 | 3.66 |
| 2 | 135 | 2.65 |
| 3 | 31.8 | 3.76 |
| 4 | 51.1 | 3.28 |
| 5 | 48.8 | 3.37 |
| 6 | 77.1 | 2.90 |
| 7 | 32.3 | 3.22 |
| 8 | 145 | 2.64 |
| 9 | 141.2 | 2.54 |
| Comp. Ex. | | |
| 1 | 10.6 | 4.01 |
| 2 | 23 | 2.5 |

In the table, the unit of $KO_2$ is cc · cm/cm$^2$ · sec · cmHg.

EFFECTS OF THE INVENTION

Conventional gas separating membranes for producing oxygen-enriched air are either those producing oxygen-enriched air only in small amounts although in a high oxygen concentration (40% by volume) or those producing oxygen-enriched air in only a low oxygen concentration (30% by volume) although in large amounts. In contrast, the gas separating membrane of the present invention is capable of producing large amounts of oxygen-enriched air having a relatively high oxygen concentration (about 30 to about 40% by volume) and is suitable for use, e.g., with fermentation and in combustion burners.

We claim:

1. An acryloxyorganosiloxane polymer comprising a structural unit represented by the formula (1):

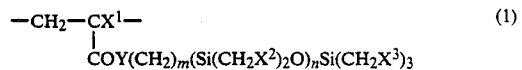

wherein X$^1$ is chlorine atom or fluorine atom, X$^2$ and X$^3$ are the same or different and each represent hydrogen atom or a group —CH$_2$(CF$_2$)$_p$CF$_3$ wherein p is 0 or an integer of 1 to 5, Y is oxygen atom or —NH— group, m is 0 or an integer of 1 to 5 and n is 0 or an integer of 1 to 5.

2. An acryloxyorganosiloxane polymer according to claim 1 wherein X$^1$ in the formula (1) is fluorine atom.

3. An acryloxyorganosiloxane polymer according to claim 1 which comprises the structural unit of the formula (1) in an amount of 50% to 100% by weight and a structural unit represented by the following formula (2) in an amount of not more than 50% by weight based on the combined weight of the structural unit of the formula (1) and structural unit of the formula (2):

$$-CH_2-CX^4- \atop | \atop COOR \qquad (2)$$

wherein $X^4$ is hydrogen atom, chlorine atom, fluorine atom, alkyl group having 1 to 3 carbon atoms or fluoroalkyl group having 1 to 3 carbon atoms, R is alkyl group having 1 to 20 carbon atoms, fluoroalkyl group have 1 to 20 carbon atoms or fluoroalkylether group having 1 to 20 carbon atoms.

4. An acryloxyorganosiloxane polymer according to claim 3 wherein R in the formula (2) is a group represented by the formula $$-(CH_2)_pRf$$

wherein Rf is fluoroalkyl group having 1 to 19 carbon atoms and containing fluorine in an amount of at least twice the number of carbon atoms, and p is an integer of 1 to 5, or a group represented by the formula $$-(CH_2)_qCF(CF_3)(OCF_2CF(CF_3))_rOC_3F_7$$

wherein q is an integer of 1 to 5 and r is 0 or an integer of 1 to 5.

5. A gas separating membrane comprising a membrane of a polymer comprising the structural unit represented by the formula (1):

$$-CH_2-CX^1- \atop | \atop COY(CH_2)_m(Si(CH_2X^2)_2O)_nSi(CH_2X^3)_3 \qquad (1)$$

wherein $X^1$ is chlorine atom or fluorine atom, $X^2$ and $X^3$ are the same or different and each represent hydrogen atom or a group $-CH_2(CF_2)_pCF_3$ wherein p is 0 or an integer of 1 to 5, Y is oxygen atom or $-NH-$ group, m is 0 or an integer of 1 to 5 and n is 0 or an integer of 1 to 5.

6. A gas separating membrane according to claim 5 wherein $X^1$ in the formula (1) is fluorine atom.

7. A gas separating membrane according to claim 5 which is prepared from the polymer having the structural unit of the formula (1) in an amount of 50% to 100% by weight and the structural unit of the formula (2) in an amount of not more than 50% by weight based on the combined weight of the structural unit of the formula (1) and the structural unit of the formula (2):

$$-CH_2-CX^4- \atop | \atop COOR \qquad (2)$$

wherein $X^4$ is hydrogen atom, chlorine atom, fluorine atom, alkyl group having 1 to 3 carbon atoms or fluoroalkyl group having 1 to 3 carbon atoms, R is alkyl group having 1 to 20 carbon atoms, fluoroalkyl group have 1 to 20 carbon atoms or fluoroalkylether group having 1 to 20 carbon atoms.

8. A gas separating membrane according to claim 7 wherein R in the formula (2) is a group represented by the formula $$-(CH_2)_pRf$$

wherein Rf is fluoroalkyl group having 1 to 19 carbon atoms and containing fluorine in an amount of at least twice the number of carbon atoms, and p is an integer of 1 to 5, or a group represented by the formula $$-(CH_2)_qCF(CF_3)(OCF_2CF(CF_3))_rOC_3F_7$$

wherein q is an integer of 1 to 5 and r is 0 or an integer of 1 to 5.

9. A gas separating membrane according to claim 5 wherein the thickness of the membrane is about 0.1 to about 200 μm.

* * * * *